Sept. 4, 1928.　　　　R. J. THOMPSON ET AL　　　1,683,271
FLOWERPOT DEVICE
Filed June 4, 1925　　　2 Sheets-Sheet 1
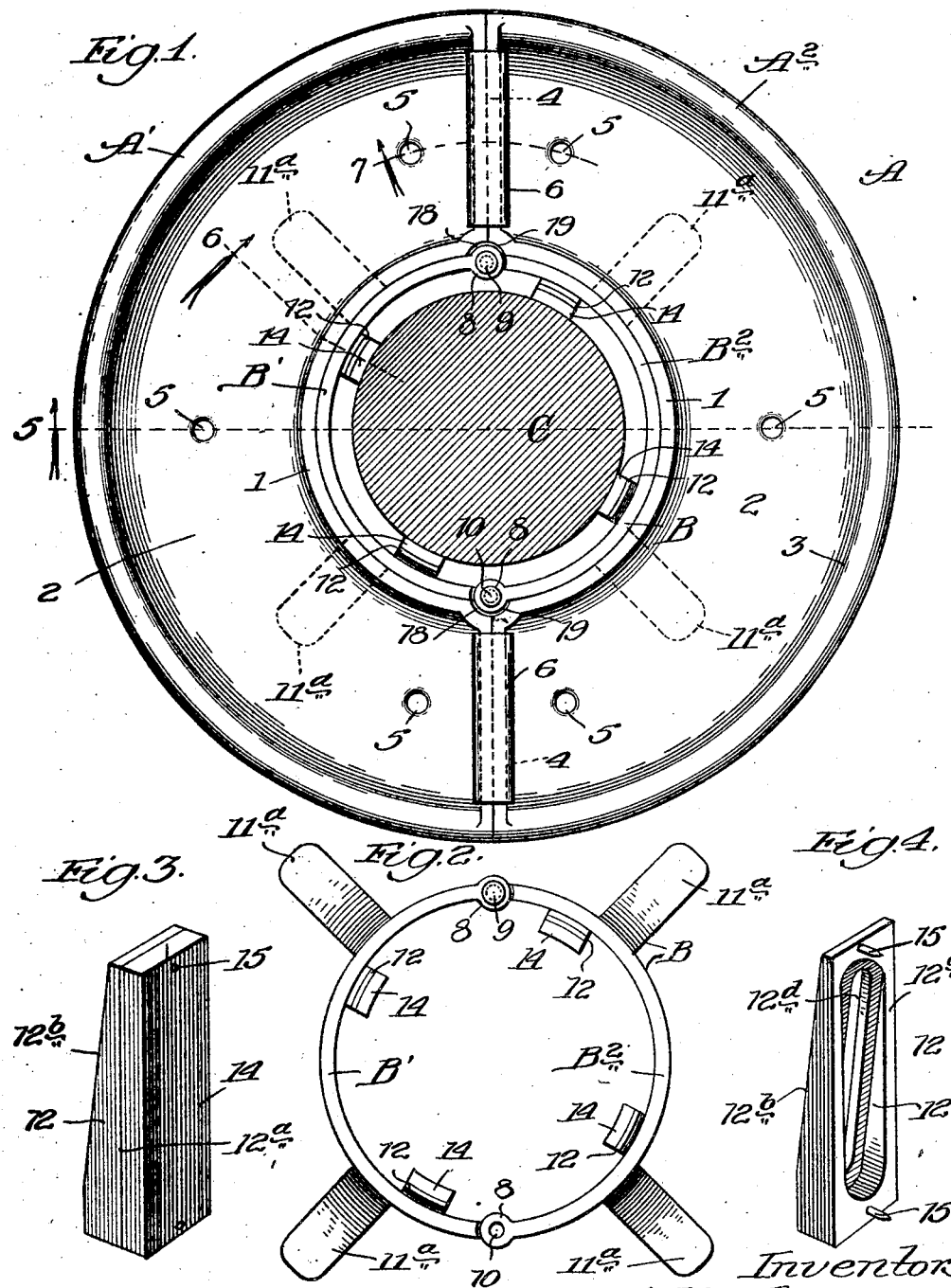

Sept. 4, 1928.
R. J. THOMPSON ET AL
FLOWERPOT DEVICE
Filed June 4, 1925
1,683,271
2 Sheets-Sheet 2
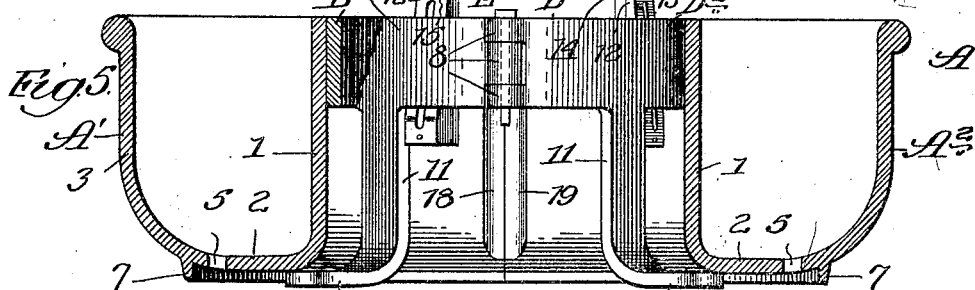
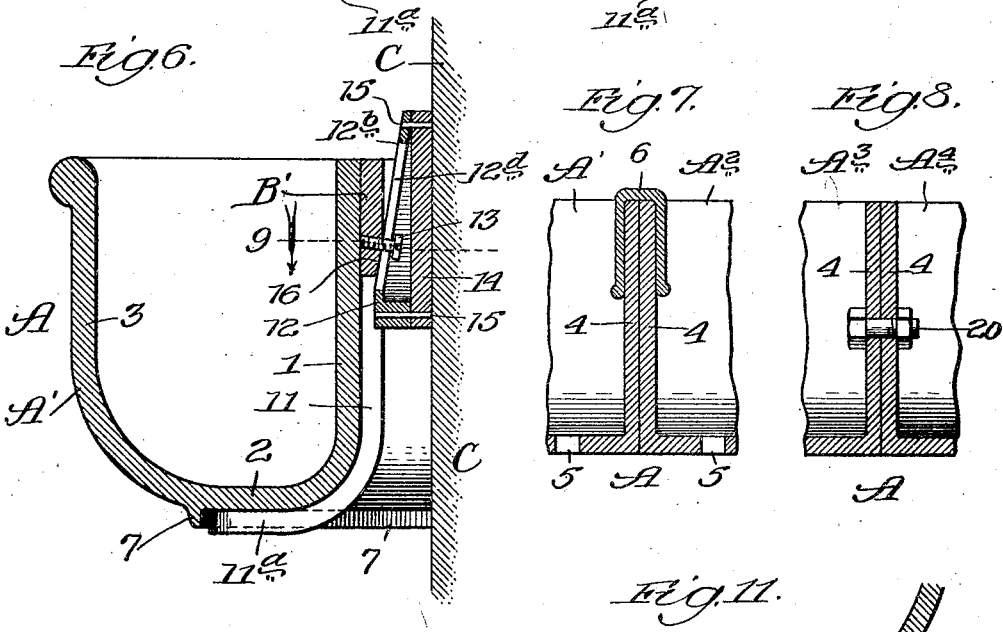
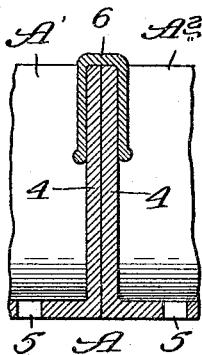
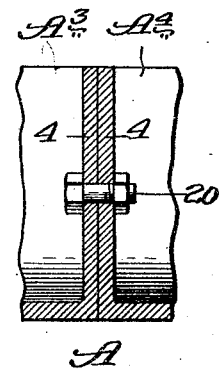
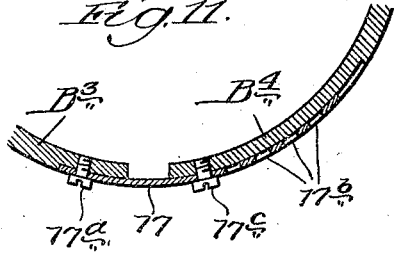
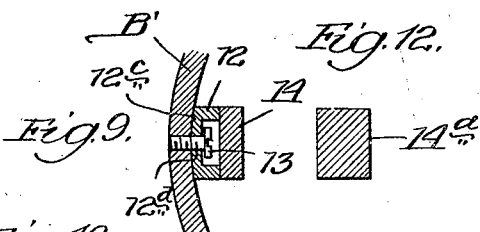
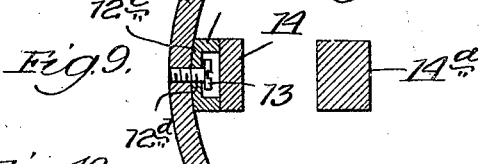
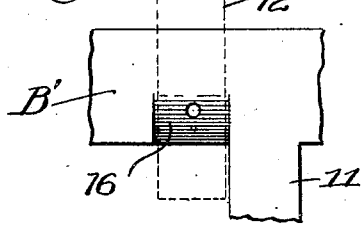

Patented Sept. 4, 1928.

UNITED STATES PATENT OFFICE.

1,683,271

ROBERT JOHN THOMPSON, OF PARIS, FRANCE, AND CHARLES FISHER, OF NEW YORK, N. Y.

FLOWERPOT DEVICE.

Application filed June 4, 1925. Serial No. 34,861.

This invention relates particularly to a flower pot device adapted to be applied to a post, or standard. An important use for the device is in connection with the ornamentation of boulevard lamp posts. The invention may be employed in analogous situations.

The primary object is to provide a simple, cheap and durable device of the character indicated, which can be readily secured to, or removed from, a post and which is thoroughly adapted to its purpose.

The invention is illustrated in its preferred embodiment in the accompanying drawings, in which—

Fig. 1 represents a plan sectional view showing the improved flower pot device applied to a post, or standard, the latter being shown in section; Fig. 2, a plan view of the post-embracing bracket-ring employed; Fig. 3, a perspective view of one of the wedges and an associated shim, or fillet, employed; Fig. 4, a perspective view of the opposite side of the wedge shown in Fig. 3; Fig. 5, a sectional view of the flower pot and an elevational view of the bracket-ring, the latter being shown brokenly and partly in section, the section being taken as indicated at line 5 of Fig. 1; with the wedges shown attached to the inner surface of the front portion of the clamping ring, and thus, owing to their position, appearing in perspective; Fig. 6, an enlarged broken sectional view showing the device applied to a post, the section being taken as indicated at line 6 of Fig. 1; Fig. 7, a broken vertical sectional view taken as indicated at line 7 of Fig. 1 and illustrating the means for securing together the sections of the flower pot; Fig. 8, a similar sectional view showing modified means for connecting the sections of the flower pot; Fig. 9, a broken horizontal section taken as indicated at line 9 of Fig. 6; Fig. 10, a broken inner elevational view of the bracket-ring; Fig. 11, a broken horizontal sectional view illustrating modified means for connecting the sectors of the bracket-ring; and Fig. 12, a sectional view of a shim of greater thickness than that shown in Fig. 9.

In its preferred embodiment, the flower pot device comprises a flower pot A of sectional construction and a supporting bracket-ring B of sectional construction. The bracket-ring is shown in Figs. 1 and 6 as applied to a post, or standard, C.

The flower pot A preferably comprises two hollow arcuate members A' and A², which are complemental with respect to each other, and which, when put together, form an annular flower pot. Each of the sectors A' and A² preferably constitutes a hollow half-annulus, or a half-annular pot. Thus, each sector has an inner concavo-convex wall 1, a bottom wall 2, an outwardly and upwardly flaring outer wall 3, and end walls 4. The sectors may be made of earthenware, cast metal, or sheet metal, or other material, if desired. Each half-annular bowl, or pot, is provided in its bottom wall with perforations 5. The end walls 4 may be secured together by strong metal clips 6, as illustrated in Figs. 1 and 7. These clips are of U-shape and sufficiently resilient to enable them, when inverted, to be forced down over the end walls 4 and bind the end walls together.

Each of the half-annular bowls A' and A² is provided at its bottom portion with an external half-annular flange 7, which, as shown in Fig. 6, is adapted to co-act with the outturned arms of the supporting bracket B.

The bracket-ring B preferably is composed of two semi-circular ring-segments B' and B² having at their extremities interfitting enlargements, or hinge portions, 8, which receive pintles 9 and 10. Pintle 9 may be a permanent rivet, and the pintle 10 may be a removable pin, or stud. The ring-segments are provided with depending arms 11 which have outturned lower extremities 11ª. The outer ends of the portions 11ª are embraced by the flanges 7 of the flower pot.

The ring-segments B' and B² preferably are equipped with vertically adjustable wedge-members 12 which have flat surfaces 12ª turned towards the post C and beveled surfaces 12ᵇ disposed adjacent the inner surface of the ring-segment. The wedges have intermediate web-portions 12ᶜ which are depressed with reference to the flat face 12ª; and the web-portions 12ᶜ are provided with slots 12ᵈ which receive screws 13 which are screwed into tapped perforations with which the ring-segments are provided. Associated with the wedges are shims, or fillets, 14, which may be of wood. The wedges may be equipped with inwardly projecting studs 15 which engage perforations with which the shims 14 are provided.

The wedges 12 afford a means of adjusting the flower pot to posts of different diameters. The wooden shims 14 preferably are used to engage the post and prevent marring thereof. The shims 14 may be of different thicknesses and may be used interchangeably, the proper thickness being selected according to the diameter of the post. In Fig. 12, 14ª designates a shim similar to the shim 14, but of greater thickness. As shown in Figs. 6 and 10, the inner surface of the lower portion of each clamping-ring sector is provided with a rounded or bevel-like portion 16 against which the adjacent surface of the wedge 12 bears. This enables the wedge to adjust itself more readily, it being understood that the screw 13 is left sufficiently loose to enable the wedge to be adjusted vertically.

In the modification shown in Fig. 11, B³ and B⁴ designate ring-segments of a clamping-ring, having their end portions connected by a metal strip 17. One end of the strip is secured by a screw 17ª to one of the segments. The other end of the strip is provided with perforations 17ᵇ, any one of which may receive a screw 17ᶜ. The strip 17 may be accommodated by countersinks with which the outer surfaces of the ring-segments are provided. The expedient shown in Fig. 11 may be used in connection with ring-segments which are hinged together; or, the ring-segments may be connected together adjustably at both points by a device like that shown in Fig. 11. Ordinarily, however, it is preferred to employ the construction shown in Fig. 1, which, taken in connection with the wedges and shims, will enable the bracket-ring to be secured to posts of different diameters.

As appears from Figs. 1 and 5, the half-annular flower pots A′ and A² are provided at their inner corners with complemental recesses 18 and 19 which serve to accommodate the hinge members, or enlargements, 8 of the ring-segments.

In the modification shown in Fig. 8, A³ and A⁴ represent flower pot sectors similar to those shown in Fig. 7. In this case, the end walls 4 of the sectors are provided with perforations for bolts 20 (one shown) which serve to secure the sectors together.

The construction described is simple, may be manufactured at moderate cost, and may be easily applied to, or removed from, a post, or column. The improved flower pot is of pleasing appearance, and by its use, boulevard lamp posts, for example, may be ornamented with vines and flowers. The feature of ready removability enables the flower pot to be removed, and cleaned and repainted, or redecorated, when desired. The bracket-ring is housed within the annular flower pot and is thus hidden. The engagement between the bracket-arms 11ª and the lower portion of the flower pot prevents shifting of the flower pot with relation to the supporting bracket.

The foregoing detailed description has been given for clearness of understanding only, and no unnecessary limitations should be understood therefrom, but the appended claims should be construed as broadly as permissible.

What we regard as new, and desire to secure by Letters Patent, is:

1. A flower pot device comprising a post-clamping bracket-ring provided with depending outturned arms, and an annular flower pot supported on said arms comprising hollow arcuate sectors open at their upper sides.

2. A flower pot device comprising a bracket-ring, adjustable wedges within and movably attached to said ring, and arcuate flower pot sectors mounted on and embracing said ring.

3. A flower pot device comprising a bracket-ring having outturned arms, adjustable wedge-members within and movably attached to said ring, flower pot sectors embracing said bracket-ring and mounted on said arms, and connecting means joining said flower pot sectors.

4. A flower pot device comprising a pair of pivotally connected half-annular ring-segments equipped interiorly with movably connected wedges, means for connecting the free ends of said ring-segments, arcuate flower pot sectors embracing said ring segments, and means for securing said sectors on said ring-segments.

5. A flower pot device comprising a bracket-ring, equipped interiorly with movably connected wedges, adjustable means for securing said ring to a post, arms carried by said ring having outturned extremities, and an annular flower pot comprising arcurate hollow sectors having open upper ends and having at their lower portions flanges embracing the ends of said arms.

6. A flower pot device comprising a pair of half-annular bracket-ring segments, pintles connecting said segments, wedge-members adjustably connected with the inner surfaces of said segments, and an annular flower pot comprising a pair of half-annular sectors mounted on said bracket-ring.

7. A bracket-ring for the purpose set forth, comprising a pair of half-annular ring-segments provided with depending arms having outturned extremities, connecting means joining the extremities of the ring-segments, and wedge-members adjustably connected with the inner surfaces of said ring-segments.

ROBERT JOHN THOMPSON.
CHARLES FISHER.